(12) United States Patent
Purkayastha et al.

(10) Patent No.: US 12,349,709 B2
(45) Date of Patent: Jul. 8, 2025

(54) STEVIOL GLYCOSIDE COMPOSITIONS

(71) Applicant: PURECIRCLE USA INC., Westchester, IL (US)

(72) Inventors: Siddhartha Purkayastha, Chicago, IL (US); John Martin, Bridgewater, NJ (US); Marcia Petit, Bridgewater, NJ (US); Kristina Chkhan, Kuala Lumpur (MY)

(73) Assignee: PURECIRCLE USA INC., Westchester, IL (US)

( * ) Notice: Subject to any disclaimer, the term of this patent is extended or adjusted under 35 U.S.C. 154(b) by 0 days.

(21) Appl. No.: 18/296,605

(22) Filed: Apr. 6, 2023

(65) Prior Publication Data
US 2023/0240345 A1 Aug. 3, 2023

Related U.S. Application Data

(63) Continuation of application No. 15/771,248, filed as application No. PCT/US2016/058834 on Oct. 26, 2016, now Pat. No. 11,647,771.

(60) Provisional application No. 62/255,838, filed on Nov. 16, 2015, provisional application No. 62/246,412, filed on Oct. 26, 2015.

(51) Int. Cl.
*A23L 27/30* (2016.01)
*A23L 2/60* (2006.01)
*A23L 33/20* (2016.01)

(52) U.S. Cl.
CPC ............... *A23L 27/36* (2016.08); *A23L 2/60* (2013.01); *A23L 33/20* (2016.08); *A23V 2002/00* (2013.01); *A23V 2200/132* (2013.01); *A23V 2200/15* (2013.01); *A23V 2250/258* (2013.01); *A23V 2250/262* (2013.01)

(58) Field of Classification Search
None
See application file for complete search history.

(56) References Cited

U.S. PATENT DOCUMENTS

| | | |
|---|---|---|
| 2011/0183056 A1 | 7/2011 | Morita et al. |
| 2013/0071339 A1 | 3/2013 | Markosyan |
| 2013/0337138 A1* | 12/2013 | Purkayastha ........... A23F 3/405 426/597 |
| 2014/0227421 A1 | 8/2014 | Markosyan |
| 2015/0257424 A1 | 9/2015 | Catani et al. |

FOREIGN PATENT DOCUMENTS

| | | | |
|---|---|---|---|
| EP | 3009010 A1 * | 4/2016 | ............ A23L 2/00 |
| EP | 2350110 B1 | 6/2016 | |
| JP | H0446190 A | 2/1992 | |
| WO | WO2012129451 A1 | 9/2012 | |
| WO | WO2014086890 A1 | 6/2014 | |
| WO | WO2014122227 A2 | 8/2014 | |
| WO | 2014/197898 | 12/2014 | |
| WO | WO2015023928 A1 | 2/2015 | |
| WO | WO2015152707 A1 | 10/2015 | |
| WO | WO2016100689 A1 | 6/2016 | |
| WO | WO2016143361 A1 | 9/2016 | |
| WO | WO2016187559 A1 | 11/2016 | |
| WO | 2017031301 A1 | 2/2017 | |
| WO | 2016/034942 | 8/2022 | |

OTHER PUBLICATIONS

Chatsudthipong, et al. Stevioside and related compounds: Therapeutic benefits beyond sweetness, pp. 41-45 Phannacoloev & Therapeutics 121 (2009).
Crammer, et al., "Sweet glycosides from the Stevia plant", Chemistry in Britain, Oct. 1986, 915-916, 918.
Zhang, et al. "Membrane-based separation schemem for processing sweetener from Stevia leaves", Food Research International, vol. 33 2000, 617-620.
Chen, et al., "Enrichment and separation of rebaudioside A from stevia glycosides by a novel adsorbent with nvridvl grouo", Science in China, vol. 42, No. 3 1999, 277-282.
A-Glucosyltransferase Treated Stevia, Japan's Specifications and Standards for Food Additives, VIII edition, 2009, p. 257.
FAO/WHO "Combined Compendium of Food Additive Specifications" FAO JECFA Monographs 1, vol. 4, 2006, Food and Agricultural Organization of the United Nations, Rome.
Bae S. et al.; "Manufacturing enzymatically modified Stevia for use in food and drink e.g. alcoholic beverage and for use as sweetening agent, flavor enhancer and reagent, involves adding cyclodextrin glucosyltransferase and Stevia extract in solvent", WPI/Thomson, vol. 2009, No. 60, Mar. 16, 2009, XP002729278.
Fuh, "Purification of steviosides by membrane and ion exchange process", Journal of Food Science, vol. 55, No. 5 1990, 1454-1457.
Markovic et al., "Chemical composition ofleafextracts ofStevia rebaudiana Bergoni grown experimentally in Vogvodina", J. Serb. Chem. Soc. 73 (3) 283-297 (2008).
Dubois et al., "Diterpenoid Sweeteners. Synthesis and Sensory Evaluation of Stevioside Analogues with Improved Organoleptic Propellies," J. Med. Chem. vol. 28, (1985) 93-98.
Espinoza et al., "Identification, Quantification, and Sensory Characterization of Steviol Glycosides from Differently Processed Stevia rebaudiana Commercial Extracts", Agric. Food Chern. 20 1 4 62, 1 1 797-11804.
Chen, et al., "Selectivity of polymer adsorbent in adsorptive separations of stevia diterpene glycisides", Science in China, vol. 41, No. 4 1998, 436-441.
"Toxicity, Alcohols". Available online as ofJan. 29, 2010 from emedicine.medscape.com. pp. 1-4.
Harman et al. "Sensory Testing for Flavorings with Modifying Properties", ift.org, Number 2013, vol. 67, No. 11, 15 pages.
Yoshikawa, et al. "Transglycosylation ofMogroside V, a Triterpene Glycoside in Siraitia grosvenori, by Cyclodextrin Glucanotransferase and Improvement of the Qualities ofSweetness," The Japanese Society of Applied Glycoscience, vol. 52, No. 3, 2005, 247-252.

(Continued)

*Primary Examiner* — Jyoti Chawla

(57) ABSTRACT

Steviol glycoside compositions having improved sweetness and flavor profiles are described.

3 Claims, 7 Drawing Sheets

(56) References Cited

OTHER PUBLICATIONS

Ahmed, et al., "Use of p-Bromophenacyl Bromide to Enhance Ultraviolet Detection of Water-Soluble Organic Acids (Steviolbioside and Rebaudioside B) in High-Performance Liquid Chromatographic Analysis", Journal of Chromatography, vol. 192, 1980, 387-393.
Chaturvedula et al., "Two Minor Diterpene Glycosides from the Leaves ofStevia rebaudiana", Natural Product Communications, 2011, vol. 6, No. 2, pp. 175-178.
Remington: The Science and Practice of Pharmacy, 21st Edition. The University of the Sciences in Philadelphia, 2006. Pa11 5, p. 700.
Ohta et al: "Characterization of Novel Steviol Glycosides from Leaves of Stevia rebaudiana Morita", Oyo Toshitsu Kagaku—Journal of Applied Glycoscience, vol. 57, No. 3, Aug. 17, 2010, pp. 199-209.
Darise et al., "Enzymic Transglucosylation of Rubusoside and the Structure-Sweetness Relationship ofSteviol Biselvcosides," Agric. Biol. Chem. vol. 48(10), 1984, 2483-2488.
"Acetone". Available online from Sigma-Aldrich as ofJan. 4, 2016. pp. 1-2.
Chang, S. S. et al., "Stability Studies of Stevioside and Rebaudioside A in Carbonated Beverages", Journal of Agricultural and Food Chemistry, vol. 31, 1983, 409-412.
Zell, et al. "Investigation ofPolymorphism in Aspartame and Neotame Using Solid-State NMR Spectroscoov", Tetrahedron, vol. 56, 2000, 6603-6616.
Ye, et al. "Modification ofstevioside using transglucosylation activity ofBacillus amyloliquefaciens a-amylase to reducets bitter afte11aste," LWT—Food Science and Technology, vol. 51, Issue I, May 2013, nP's.524-530.
Chaturvedula et al., "Structures ofthe novel diterpene glycosides from Stevia rebaudiana", Carbohydrate Research 346 (20I 1) pp. 1057-1060.
Fullas et al., "Separation of natural product sweetening agents using overpressured layer chromatography," Journal of Chromatography vol. 464 (1989) 213-219.
Hale, et al., "Amylase of Bacillus Macerans", Cereal Chemistry, vol. 28, No. 1, Jan. 1951, 49-58.
"Methanol". Available online from Sigma-Aldrich as ofJan. 4, 2016. pp. 1-2.
Ibrahim et al., "Minor Diterpene Glycosides from the Leaves ofStevia Rebaudiana", J. Nat. Prod., 2014, 77, 1231-1235.
Goyal et al., "Stevia (*Stevia rebaudiana*) a bio-sweetener: a review", International Journal of Food Sciences and Nutrition, Feb. 20 lO; 61, pp. 1-10.
Chen, et al., "Studies on the adsorptive selectivity of the polar resin with carbonyl group on rebaudioside A", Acta Polymeric Scnica, No. 4 1999, 398-403.
Rajbhandari et al., "The Flavonoids ofStevia Rebaudiana", Department of Pharmacognosy, Mar.-Apr. 1983, pp. 194-195.
Fukunaga et al., "Enzymic Transglucosylation Products of Stevioside: Separation and Sweetness-evaluation," Agric. Biol. Chem. vol. 53(6) (1989) 1603-1607.
Yoda, et al. "Supercritical fluid extraction from Stevia rebaudiana Bertoni using CO2 and CO2+ water: extraction kinetics and identification of extracted components", Journal of Food Engineering, vol. 57 2003, 125-134.

\* cited by examiner

800ppm of 50/50 Reb M/Reb D blend in diet lemon-lime carbonated soft drink (first bars)

1300ppm of GSG containing 19% glycosylated Reb Q and 18% glycosylated Reb R in diet lemon-lime carbonated soft drink (second bars)

STEVIOL GLYCOSIDE COMPOSITIONS

This application is a continuation of application Ser. No. 15/771,248, filed on Apr. 26, 2018, which is now allowed, which is a national-stage entry of application No. PCT/US2016/058834, filed on Oct. 26, 2016, and claims priority to Provisional Application No. 61/246,412, filed Oct. 26, 2015, and Provisional Application No. 62/255,838, filed Nov. 16, 2015.

BACKGROUND OF THE INVENTION

The invention is directed to the positive impact of minor steviol glycosides on the sweetness profile of *stevia* sweeteners.

Sugar alternatives are receiving increasing attention due to awareness of many diseases in conjunction with consumption of high-sugar foods and beverages. However, many artificial sweeteners such as dulcin, sodium cyclamate and saccharin were banned or restricted in some countries due to concerns on their safety. Therefore non-caloric sweeteners of natural origin are becoming increasingly popular. The sweet herb *Stevia rebaudiana* produces a number of diterpene glycosides which feature high intensity sweetness and sensory properties superior to those of many other high potency sweeteners.

*Stevia rebaudiana* is a plant species belonging to the Astracea family, and is native to South America and cultivated now in many parts of the world (Gardana et al., 2003; Koyama et al., 2003; Carakostas et al., 2008). *Stevia* leaves are naturally sweet, and have been used for sweetening food products for hundreds of years in South America (Soejarto et al., 1982). Extracts of *Stevia rebaudiana* have been used commercially to sweeten foods in Japan and other Southeast Asian countries for a number of years (Koyama et al., 2003). As a product of nature, the *stevia* plant leaves contain different sweet tasting components, called steviol glycosides. Reportedly, more than 40 steviol glycosides have been identified that are typically present in the *stevia* leaf extract (Ceunen and Geuns, 2013; Chaturvedula et al., 2011a,b,c; Chaturvedula and Prakash, 2011a,b; Ohta et al., 2010). Each of these steviol glycosides has its own unique taste profile and sweetness intensity, which can be up to 350 times sweeter than sugar, but all share a similar molecular structure where different sugar moieties are attached to aglycone steviol (an ent-kaurene-type diterpene). The generic structure of the steviol glycosides is presented in FIG. 1.

Rebaudioside A and stevioside have garnered the most commercial interest and have been extensively studied and characterized in terms of their suitability as commercial high intensity sweeteners. Stability studies in carbonated beverages confirmed their heat and pH stability (Chang S. S., Cook, J. M. (1983) Stability studies of stevioside and rebaudioside A in carbonated beverages. J. Agric. Food Chem. 31: 409-412.)

Steviol glycosides differ from each other not only by molecular structure, but also by their taste properties. Usually stevioside is found to be 110-270 times sweeter than sucrose and rebaudioside A is between 150 and 320 times sweeter than sucrose. Rebaudioside A has the least astringent, the least bitter, and the least persistent aftertaste thus possessing the most favorable sensory attributes in major steviol glycosides (Tanaka O. (1987) Improvement of taste of natural sweeteners. *Pure Appl. Chem.* 69:675-683; Phillips K. C. (1989) *Stevia*: steps in developing a new sweetener. In: Grenby T. H. ed. Developments in sweeteners, vol. 3. Elsevier Applied Science, London. 1-43.)

By the early 21st century, only a limited number of the chemical structures of steviol glycosides in *Stevia rebaudiana* have been characterized including stevioside, rebaudioside A-F, dulcoside A, and steviolbioside (Ceunen and Geuns, 2013). In recent years, many minor steviol glycosides with diverse chemical structures, have been reported from the leaves of *Stevia rebaudiana* (Chaturvedula et al., 2011a,b,c; Chaturvedula and Prakash, 2011a,b). These diverse steviol glycosides, which are ent-kaurene-type diterpenes, are connected to various sugars such as glucose, rhamnose, xylose, fructose and deoxy glucose at C-13 and C-19 positions via 1,2-; 1,3-; 1,4- or 1,6-α or β-glycosidic linkages. The identity and grouping of various steviol glycosides is summarized in Table 1. Due to the large number of steviol glycosides, Table 1 lists the steviol glycosides in 5 groups depending on the sugar moieties connected to the steviol backbone and identified with abbreviated compositional names.

Glucosyl steviol family: comprising only steviol and glucose residues. This group can be presented by general formula "SvGn", wherein Sv is the steviol and G is glucose.

Rhamnosyl steviol family: comprising steviol, rhamose and glucose residues. This group can be presented by general formula "SvR1Gn", wherein R is the Rhamnose.

Xylosyl steviol family: comprising steviol, xylose and glucose residues. This group can be presented by general formula "SvX1Gn", wherein X is the Xylose.

Fructosyl steviol family: comprising steviol, fructose and glucose residues. This group can be presented by general formula "SvF1Gn", wherein F is the Fructose.

Deoxyglucose steviol family: comprising steviol, deoxyglucose and glucose residue. This group can be presented by general formula SvdG1Gn.

TABLE 1

| # | Common Name | Abbr. Formula | $R_1$ | $R_2$ |
|---|---|---|---|---|
| 1) Steviol + Glucose (SvGn) | | | | |
| 1.1 | Steviolmonoside | SvG1 | H | Glcβ1- |
| 1.2 | Steviol-19-O-β-D-glucoside | SvG1 | Glcβ1- | H |
| 1.3 | Rubusoside | SvG2 | Glcβ1- | Glcβ1- |
| 1.4 | Steviolbioside | SvG2 | H | Glcβ(1-2)Glcβ1- |
| 1.5 | Stevioside | SvG3 | Glcβ1- | Glcβ(1-2)Glcβ1- |
| 1.6 | Stevioside A | SvG3 | Glcβ(1-2)Glcβ1- | Glcβ1- |
| 1.7 | Rebaudioside B | SvG3 | H | Glcβ(1-2)[Glcβ(1-3)]Glcβ1- |
| 1.8 | Rebaudioside G | SvG3 | Glcβ1- | Glcβ(1-3)Glcβ1- |
| 1.9 | Stevioside B | SvG3 | Glcβ(1-3)Glcβ1- | Glcβ1- |

TABLE 1-continued

| # | Common Name | Abbr. Formula | $R_1$ | $R_2$ |
|---|---|---|---|---|
| 1.10 | Rebaudioside E | SvG4 | Glcβ(1-2)Glcβ1- | Glcβ(1-2)Glcβ1- |
| 1.11 | Rebaudioside A | SvG4 | Glcβ1- | Glcβ(1-2)[Glcβ(1-3)]Glcβ1- |
| 1.12 | Rebaudioside A2 | SvG4 | Glcβ1- | Glcβ(1-6)Glcβ(1-2)Glcβ1- |
| 1.13 | Rebaudioside D | SvG5 | Glcβ(1-2)Glcβ1- | Glcβ(1-2)[Glcβ(1-3)]Glcβ1- |
| 1.14 | Rebaudioside I | SvG5 | Glcβ(1-3)Glcβ1- | Glcβ(1-2)[Glcβ(1-3)]Glcβ1- |
| 1.15 | Rebaudioside L | SvG5 | Glcβ1- | Glcβ(1-6)GlcB(1-2)[Glcβ(1-3)]Glcβ1- |
| 1.16 | Rebaudioside Q2 | SvG5 | Glcα(1-2)Glcα(1-4)Glcβ1- | Glcβ(1-2)Glcβ1- |
| 1.17 | Rebaudioside Q | SvG5 | Glcβ1- | Glcα(1-4)Glcβ(1-2)[Glcβ(1-3)]Glcβ1- |
| 1.18 | Rebaudioside I2 | SvG5 | Glcβ1- | Glcα(1-3)Glcβ(1-2)[Glcβ(1-3)]Glcβ1- |
| 1.19 | Rebaudioside Q3 | SvG5 | Glcβ1- | Glcα(1-4)Glcβ(1-3)[Glcβ(1-2)]Glcβ1- |
| 1.20 | Rebaudioside I3 | SvG5 | Glcβ(1-2)[Glcβ(1-6)]Glcβ1- | Glcβ(1-2)Glcβ1- |
| 1.21 | Rebaudioside M | SvG6 | Glcβ(1-2)[Glcβ (1-3)]Glcβ1- | Glcβ(1-2)[Glcβ(1-3)]Glcβ1- |
| 2) Steviol + Rhamnose + Glucose (SvR1Gn) | | | | |
| 2.1 | Dulcoside A | SvR1G2 | Glcβ1- | Rhaα(1-2)Glcβ1- |
| 2.2 | Dulcoside B | SvR1G2 | H | Rhaα(1-2)[Glcβ(1-3)]Glcβ1- |
| 2.3 | Rebaudioside C | SvR1G3 | Glcβ1- | Rhaα(1-2)[Glcβ(1-3)]Glcβ1- |
| 2.4 | Rebaudioside C (isomer) | SvR1G3 | Rhaα(1-2)Glcβ1- | Glcβ(1-3)Glcβ1- |
| 2.5 | Rebaudioside H | SvR1G4 | Glcβ1- | Glcβ(1-3)Rhaα(1-2)[Glcβ(1-3)]Glcβ1- |
| 2.6 | Rebaudioside K | SvR1G4 | Glcβ(1-2)Glcβ1- | Rhaα(1-2)[Glcβ(1-3)]Glcβ1- |
| 2.7 | Rebaudioside J | SvR1G4 | Rhaα(1-2)Glcβ1- | Glcβ(1-2)[Glcβ(1-3)]Glcβ1- |
| 2.8 | Rebaudioside N | SvR1G5 | Rhaα(1-2)[Glcβ(1-3)]Glcβ1- | Glcβ(1-2)[Glcβ(1-3)]Glcβ1- |
| 2.9 | Rebaudioside O | SvR1G6 | Glcβ(1-3)Rhaα(1-2)[Glcβ(1-3)]Glcβ1- | Glcβ(1-2)[Glcβ(1-3)]Glcβ1- |
| 3) Steviol + Xylose + Glucose (SvX1Gn) | | | | |
| 3.1 | Stevioside F | SvX1G2 | Glcβ1- | Xylβ(1-2)Glcβ1- |
| 3.2 | Rebaudioside F | SvX1G3 | Glcβ1- | Xylβ(1-2)[Glcβ(1-3)]Glcβ1- |
| 3.3 | Rebaudioside F2 | SvX1G3 | Glcβ1- | Glcβ(1-2)[Xylβ(1-3)]Glcβ1- |
| 3.4 | Rebaudioside F3 | SvX1G3 | Xylβ(1-6)Glcβ1- | Glcβ(1-2)Glcβ1- |
| 4) Steviol + Fructose + Glucose (SvF1Gn) | | | | |
| 4.1 | Rebaudioside A3 | SvF1G3 | Glcβ1- | Glcβ(1-2)[Fruβ(1-3)]Glcβ1- |
| 5) Steviol + deoxyGlucose + Glucose (SvdG1Gn) | | | | |
| 5.1 | Stevioside D | SvdG1G2 | Glcβ1- | 6-deoxyGlcβ(1-2)Glcβ1- |
| 5.2 | Stevisoide E | SvdG1G3 | Glcβ1- | 6-deoxyGlcβ(1-2)[Glcβ(1-3)]Glcβ1- |
| 5.3 | Stevioside E2 | SvdG1G3 | 6-deoxyGlcβ1- | Glcβ(1-2)[Glcβ(1-3)]Glcβ1- |

SUMMARY OF THE INVENTION

The present invention is directed to improving the sweetness profile of steviol glycoside sweeteners, such as stevioside and Rebaudioside A (Reb A). It was unexpectedly discovered that certain minor steviol glycosides have a favorable impact on the sweetness profile of other steviol glycosides, including Rebaudioside D (Reb D) and Rebaudioside M (Reb M). These minor steviol glycosides, although present in small amounts, demonstrate statistically significant positive impacts on the sweetness profile of *stevia* sweeteners. As used herein, a minor steviol glycoside is one that is present in a composition in an amount less than 5%, or less than 3%.

DETAILED DESCRIPTION

Figure 1:
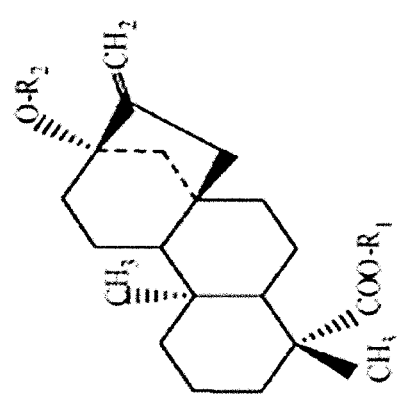
FIG. 1 shows the generic structure of steviol glycosides.

Steviol glycoside compositions including minor glycosides (SG compositions), such as Rebaudioside N and Rebaudioside O, were found to have a positive impact on the sweetness profile of *stevia* sweeteners. An exemplary steviol glycoside composition is described in Table 2.

TABLE 2

Steviol Glycoside Composition (SG Composition)

| Molecules | Structure | Steviol Glycoside Composition |
|---|---|---|
| Reb D | SvG5 | 63.95 |
| Reb M | SvG6 | 25.37 |
| Reb N | SvR1G5 | 2.95 |
| Reb O | SvR1G6 | 1.37 |
| Reb A | SvG4 | 1.32 |
| Reb E | SvG4 | 0.86 |
| Reb B | SvG3 | 0.22 |
| Stevioside | SvG3 | 0.03 |
| Reb C | SvR1G3 | 0.01 |
| Reb F | SvX1G3 | 0 |
| Dulcoside A | SvR1G2 | 0 |
| Rubusoside | SvG2 | 0 |
| Steviolbioside | SvG2 | 0 |
| Total Steviol Glycosides | | 96.07 |

Comparison of Reb D/Reb M Blends to Steviol Glycoside Compositions

Example 1: Acidified Water—5 Brix Target 15 panelists tested the sample solutions, as summarized in Table 3:

TABLE 3

Acidified water 5 brix target-SG Composition vs Reb D and Reb M blends
Summary of Mean-Scores, P-Values, and Significance

| Attribute | 5% Sugar | 200 ppm of SG Composition | 200 ppm of 70/30 Reb D/Reb M blend | P-Value | Sig |
|---|---|---|---|---|---|
| Sweetness | 4.91 | 4.86 | 4.98 | 0.0997 | |
| Bitterness | b 0.75 | ab 0.98 | a 1.23 | 0.0083 | *** |
| Astringency | b 0.84 | b 1.02 | a 1.77 | 0.0035 | *** |
| Acidity | c 0.99 | b 1.41 | a 1.99 | 0.0012 | *** |
| Off-Note (Metallic/ Licorice) | b 0.52 | b 0.61 | a 1.13 | 0.0081 | *** |
| Sweet Aftertaste | c 0.56 | b 0.99 | a 1.38 | 0.0046 | *** |
| Bitter Aftertaste | 0.33 | 0.37 | 0.53 | 0.5487 | NS |
| Overall Liking | a 4.96 | b 4.53 | b 4.46 | 0.1964 | * |

*= 80% confidence interval,
**= 90% Confidence interval,
***= 95% Confidence interval As can be seen, the steviol glycoside composition (SG composition) has many attributes that are more similar to a 5% sugar solution than a Reb D/Reb M blend, and the overall liking is greater than the Reb D/Reb M blend. Steviol glycoside compositions with minor glycosides and a 70/30 Reb D/M blend were parity in sweetness. The Reb D/Reb M 70/30 blend had significantly higher astringency, acidity, off-notes, and sweet aftertaste compared to the SG composition. The two samples have significantly different flavor profiles.

Example 2: Acidified Water—10 Brix Target

The same test was done as in Example 1, but with a 10 Brix target. 13 panelists tested the solutions, as summarized in Table 4.

TABLE 4

Acidified water 10 brix target-SG Composition vs Reb D and Reb M blends
Summary of Mean-Scores, P-Values, and Significance

| Attribute | 10% Sugar | 900 ppm of SG Composition | 900 ppm of 70/30 Reb D/ Reb M | P-Value | Sig |
|---|---|---|---|---|---|
| Sweetness | 8.45 | 8.62 | 8.45 | 0.8794 | NS |
| Bitterness | b 0.55 | a 2.18 | a 1.72 | 0.0147 | *** |
| Astringency | b 0.92 | a 1.55 | a 1.71 | 0.0762 | ** |
| Acidity | b 1.08 | a 1.56 | a 1.61 | 0.0508 | ** |

TABLE 4-continued

Acidified water 10 brix target-SG Composition
vs Reb D and Reb M blends
Summary of Mean-Scores, P-Values, and Significance

| Attribute | 10% Sugar | 900 ppm of SG Composition | 900 ppm of 70/30 Reb D/ Reb M | P-Value | Sig |
|---|---|---|---|---|---|
| Off-Note (Metallic/ Licorice) | b 0.51 | a 1.11 | a 1.34 | 0.0028 | *** |
| Sweet Aftertaste | c 1.08 | b 1.75 | a 2.25 | 0.0029 | *** |
| Bitter Aftertaste | b 0.37 | a 0.62 | a 0.82 | 0.0464 | |
| Overall Liking | a 6.34 | b 4.6 | b 4.65 | 0.0091 | *** |

*= 80% confidence interval,
**= 90% Confidence interval,
***= 95% Confidence interval In this test, the steviol glycoside composition and the Reb D/Reb M blend were parity in sweetness. The 70/30 blend also had significantly higher sweet aftertaste compared to the steviol glycoside composition.

Figure 2A:
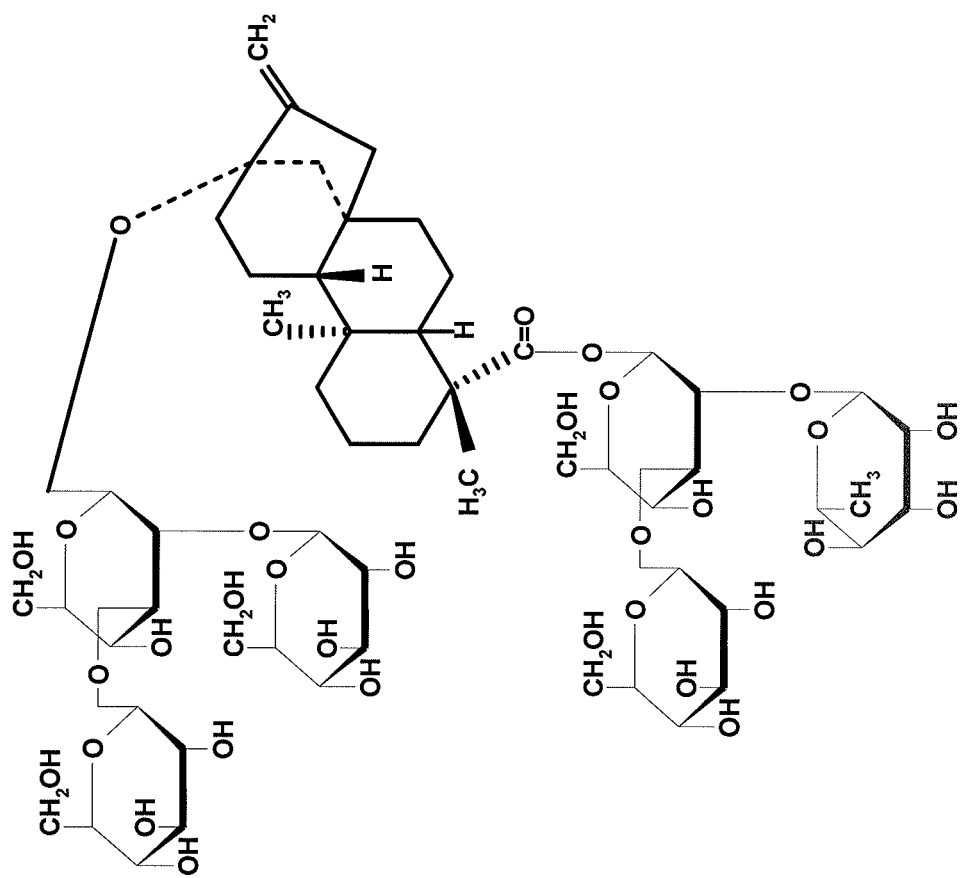
FIG. 2a shows the structure of Rebaudioside N.
Figure 2B:
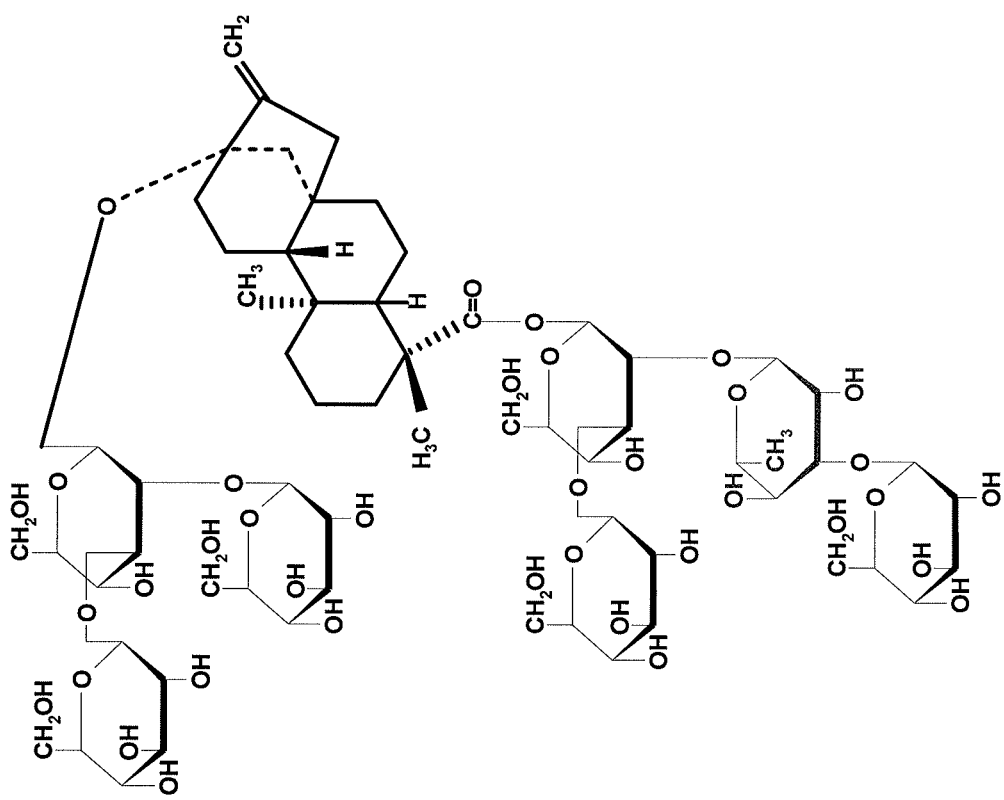
FIG. 2b shows the structure of Rebaudioside O.

While not intending to be bound by theory, it is believed that Rebaudioside N and Rebaudioside O, while present in minor amounts in the steviol glycoside composition, have a favorable impact on the flavor and sweetness profile of the steviol glycoside composition, particularly at the 5 Brix target level. The structures of Rebaudioside N and Rebaudioside O are shown in FIGS. 2a and 2b. However, certain advantages were observed even at the 10 Brix target, making these minor steviol glycosides relevant in the improvement of sweetness profiles.

Example 3: Fructosylated Steviol Glycosides

Figure 3A:
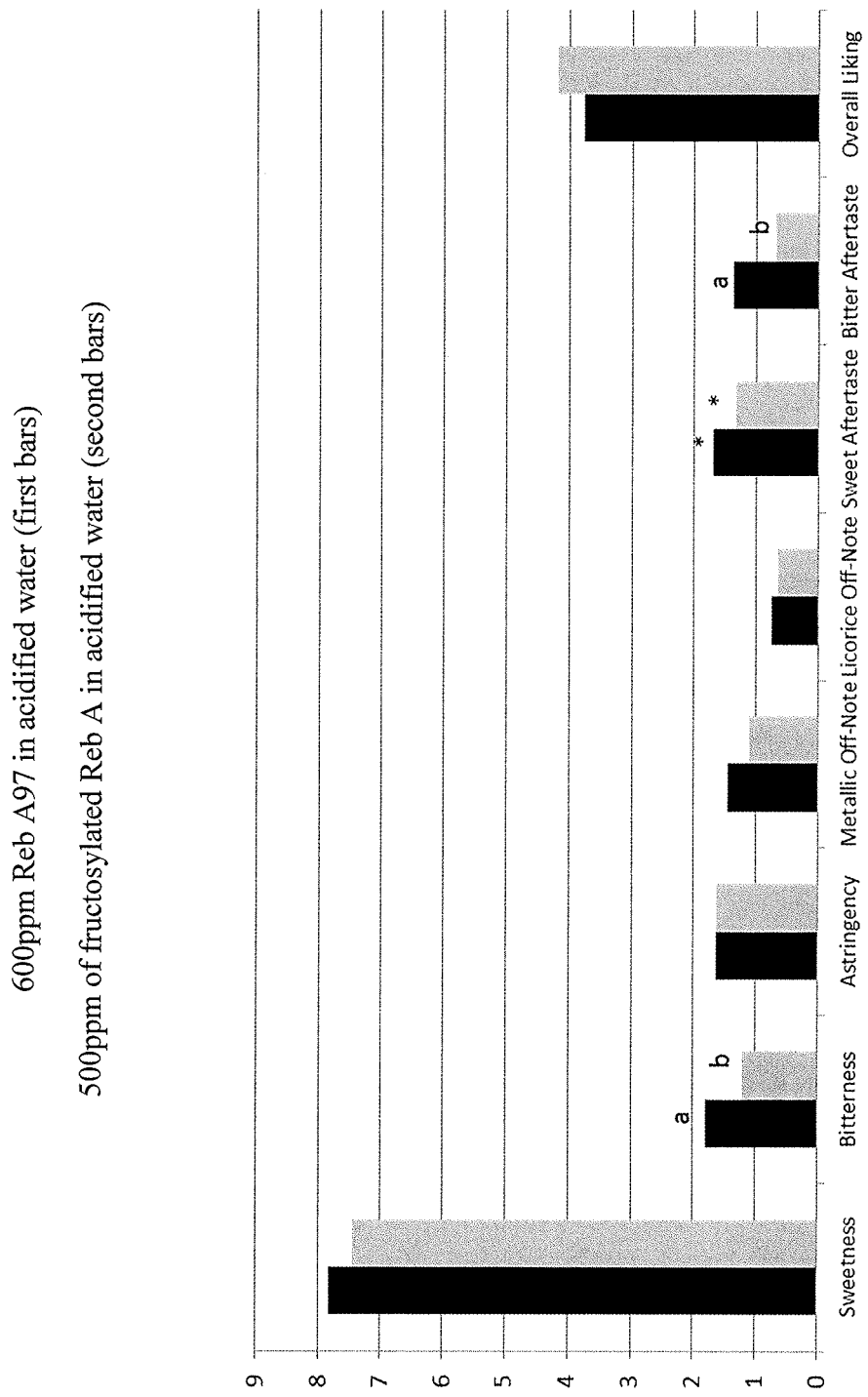
FIG. 3a is a bar graph showing the results of a taste panel. The first bars represent the results from tasting a highly purified (at least 97% pure) Rebaudioside A composition in acidified water. The second bars represent the results from tasting a fructosylated Rebaudioside A composition in acidified water.
Figure 3B:
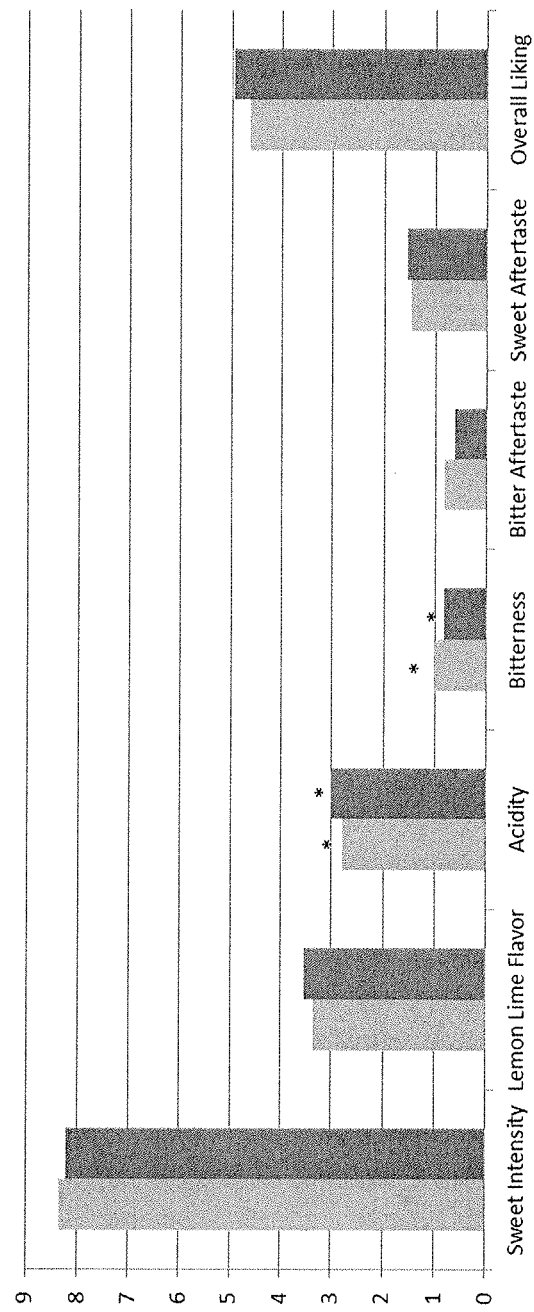
FIG. 3b is a bar graph showing the results of a taste panel. The first bars represent the results from tasting a diet lemon-lime carbonated soft drink including a highly purified Reb M/Reb D blend, wherein the blend includes 50% Reb M and 50% Reb D by weight. The second bars represent the results from tasting a diet lemon-lime carbonated soft drink including a fructosylated Rebaudioside A composition.

It was discovered that adding one or more fructose molecules to rebaudioside A provides flavor and sweetness profile advantages. It is believed that fructosylation of rebaudioside A or other steviol glycosides, including minor steviol glycosides, can provide characteristics that are similar to or even better than highly purified steviol glycosides. Rebaudioside A was subjected to a glycosylation process to add fructose to the G1 and G2 positions, and compared to a highly purified rebaudioside A composition in acidified water, and a highly purified Reb M/Reb D blend in a diet lemon-lime carbonated soft drink. The results from a trained test panel are shown in FIGS. 3a and 3b.

Example 4: Glycosylated Minor Steviol Glycosides

It was discovered that in addition to their favorable impact on the flavor and sweetness profiles of steviol glycoside compositions, the impact of minor glycosides can be improved when they are glycosylated. Glycosylated steviol glycosides (GSG) have one or more glycoside moieties attached to the steviol glycoside backbone, and have been found to have a favorable impact on attributes such as bitterness, sweetness aftertaste, etc. on steviol glycoside compositions. Glycosylated minor steviol glycosides can improve the flavor and sweetness profiles of steviol glycoside compositions to be similar to or even surpass the flavor and sweetness profiles of highly purified steviol glycosides, thereby providing an efficient and effective alternative to highly purified steviol glycosides.

The glycoside moiety can be any monosaccharide, disaccharide, or oligosaccharide, such as glucose, fructose, rhamnose, xylose, and the like. The glycoside moiety can be a single molecule, or can be a chain of molecules, for example, 2, 3 or 4 glucose units attached to the steviol glycoside. The glycosylation process typically results in the glycoside moiety attaching to the C-13 or C-19 position on the steviol glycoside.

In one embodiment, a rebaudioside A and minor steviol glycoside composition was glycosylated. The minor steviol glycoside content included glycosylated rebaudioside Q at about 19% by weight, and glycosylated rebaudioside R at about 18% by weight.

Figure 4A:
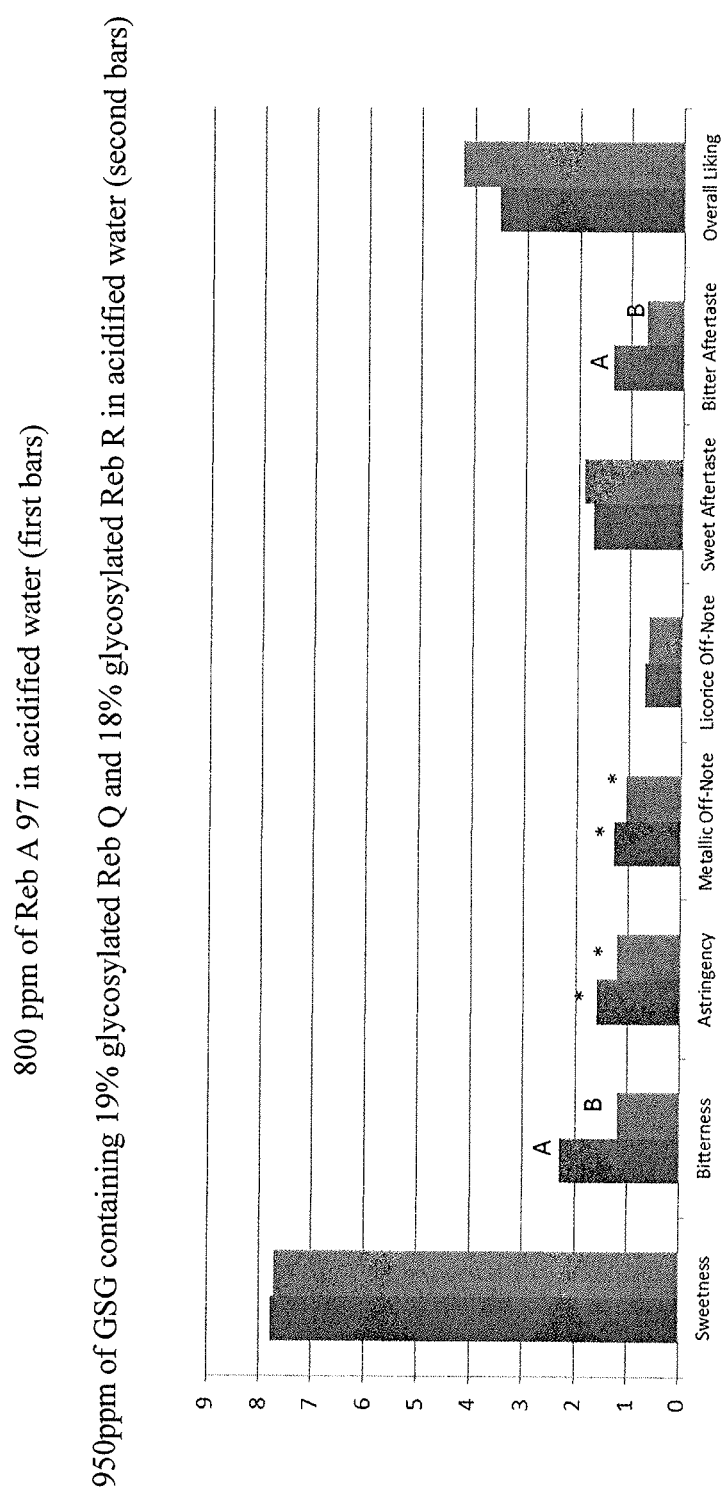
FIG. 4a is a bar graph showing the results of a taste panel. The first bars represent the results from tasting a highly purified (at least 97% pure) Rebaudioside A composition in acidified water. The second bars represent the results from tasting a glycosylated minor steviol glycoside composition in acidified water, wherein the glycosylated minor steviol glycoside composition contains 19% glycosylated Reb Q by weight and 18% glycosylated Reb R by weight.
Figure 4B:
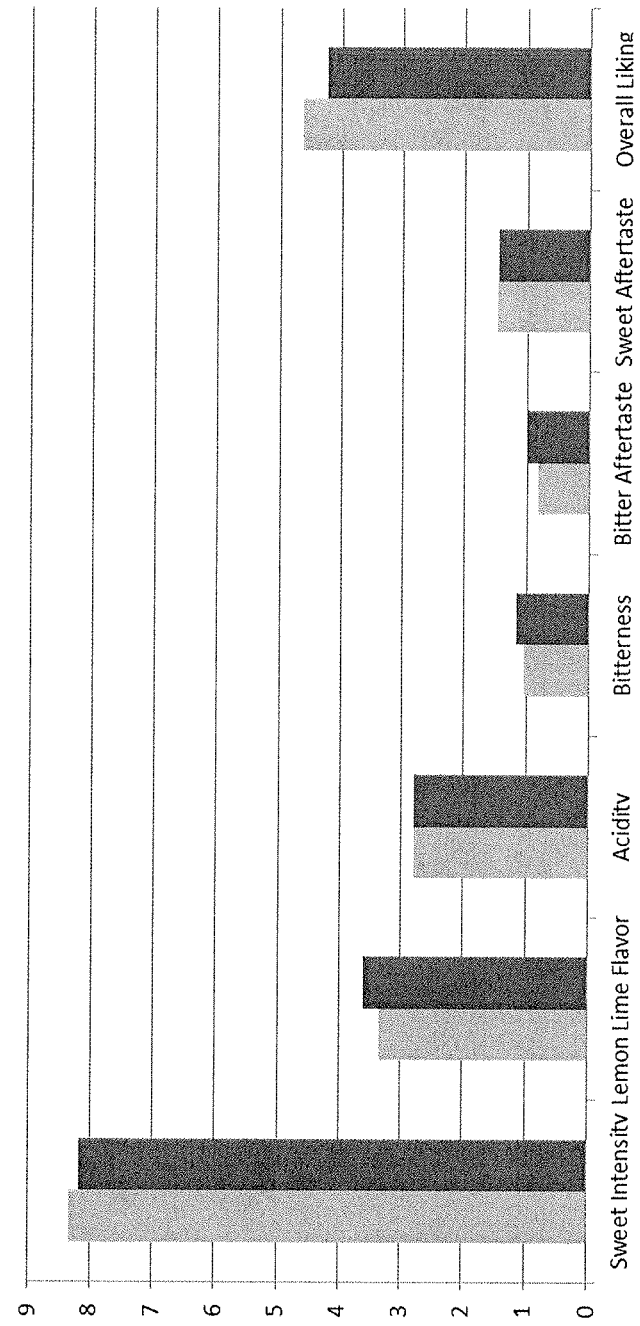
FIG. 4b is a bar graph showing the results of a taste panel. The first bars represent the results from tasting a diet lemon-lime carbonated soft drink including a highly purified Reb M/Reb D blend, wherein the blend includes 50% Reb M and 50% Reb D by weight. The second bars represent the results from tasting a diet lemon-lime carbonated soft drink including a glycosylated minor steviol glycoside composition in acidified water, wherein the glycosylated minor steviol glycoside composition contains 19% glycosylated Reb Q by weight and 18% glycosylated Reb R by weight.

Acidified water and diet lemon-lime carbonated soft drink samples containing various amounts of glycosylated minor steviol glycoside composition were tested by a trained panel, and the results are shown in FIGS. 4a and 4b. As can be seen, the glycosylated minor steviol glycoside-containing composition performed nearly the same as, and in some cases better than, highly purified steviol glycoside compositions (Reb A and Reb M/Reb D) across a number of sweetness and flavor attributes.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

The invention claimed is:

1. A method for improving the sweetness profile of a steviol glycoside composition to be similar to or even surpass the sweetness profile of a highly purified steviol glycoside comprising
    providing a steviol glycoside composition comprising 18-20% glycosylated Rebaudioside Q and 17-19% glycosylated Rebaudioside R, wherein the glycosylated Rebaudioside Q and glycosylated Rebaudioside R by weight of the steviol glycoside composition;
    wherein the highly purified steviol glycoside is defined as Rebaudioside A with a purity of at least 97%;
    and wherein the sweetness improvement is tested in an acidified water medium.

2. The method of claim 1, wherein improving the sweetness profile is characterized by reduced bitterness, astringency, off-note, and bitter aftertaste taste attributes as compared to the highly purified Rebaudioside A.

3. A steviol glycoside composition comprising 18-20% by weight glycosylated Rebaudioside Q and about 17-19% glycosylated Rebaudioside R by weight of the steviol glycoside composition.

* * * * *